United States Patent Office 3,550,372
Patented Dec. 29, 1970

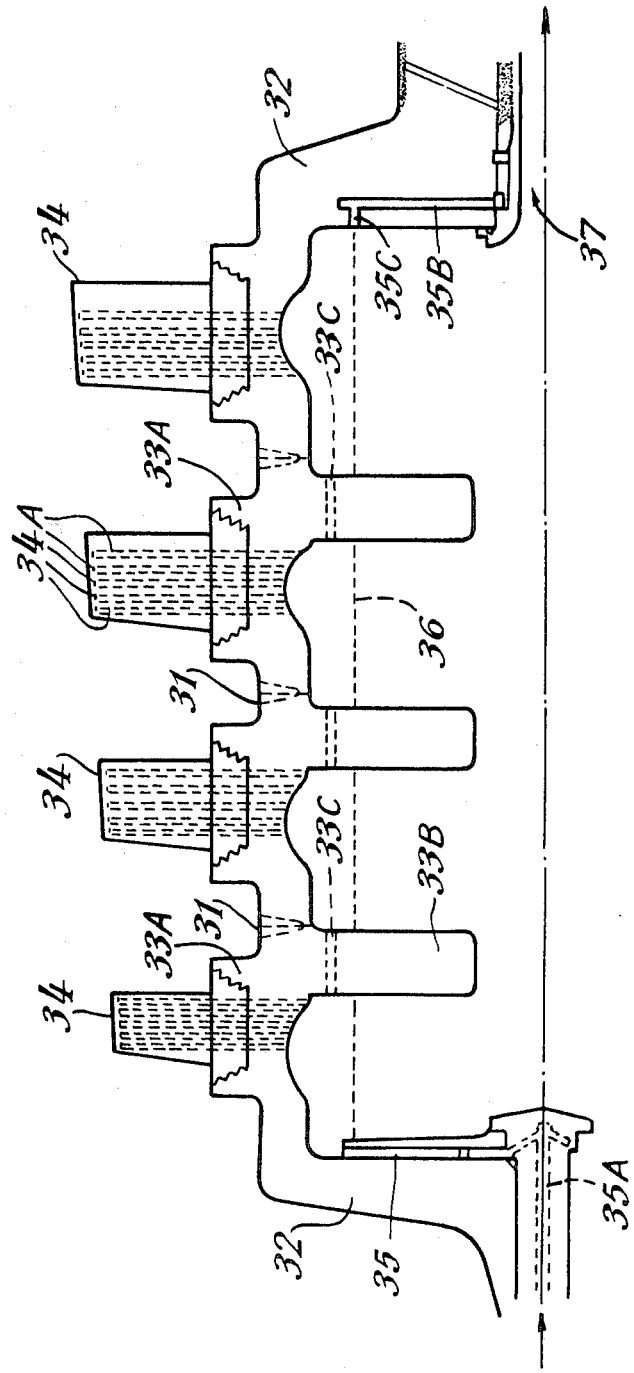

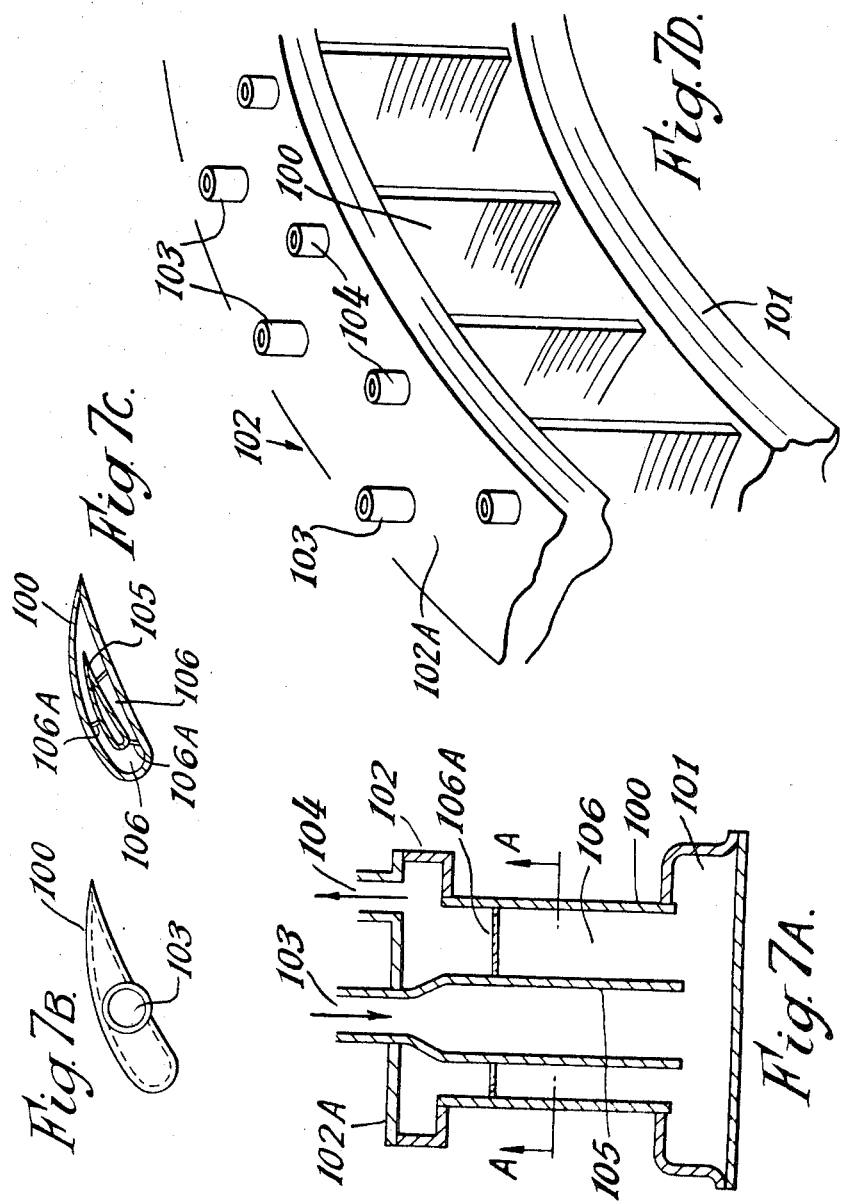

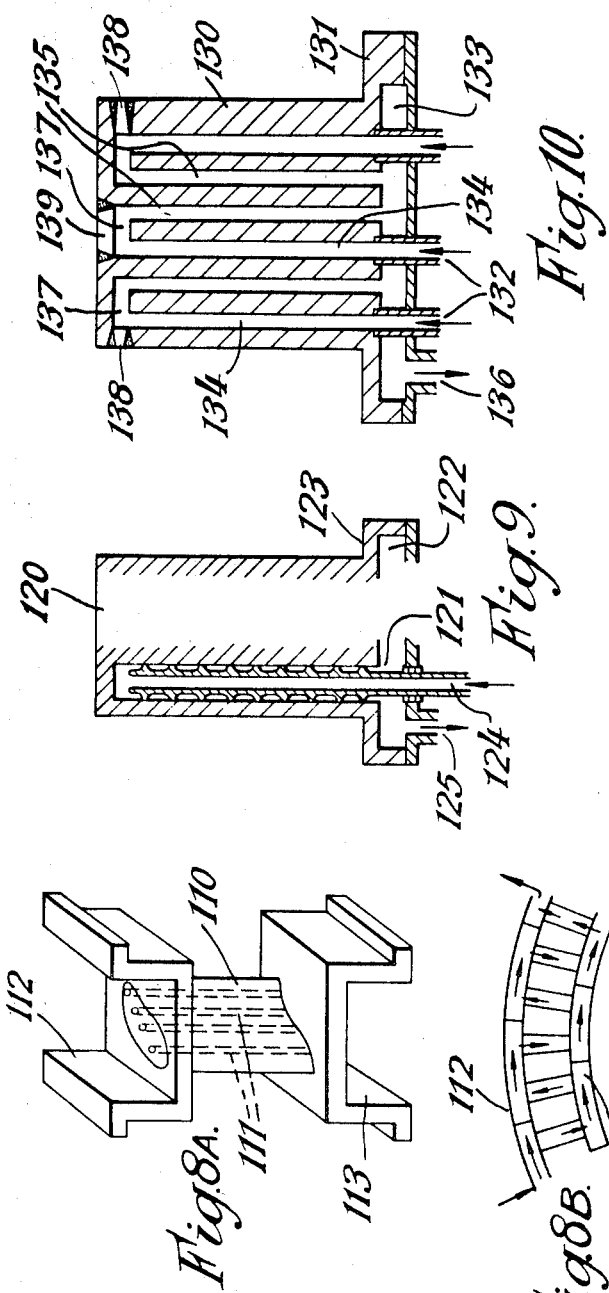

3,550,372
METHOD AND APPARATUS FOR OPERATING A GAS TURBINE WITH GASES INCLUDING CONTAMINANTS OF A RESIDUAL FUEL
Hugh Robert Morton Craig, Sale, England, assignor to Associated Electrical Industries Limited, London, England, a British company
Filed Aug. 5, 1968, Ser. No. 750,347
Claims priority, application Great Britain, Aug. 3, 1967, 35,641/67
Int. Cl. F02c 7/14
U.S. Cl. 60—39.02     11 Claims

ABSTRACT OF THE DISCLOSURE

The invention is of a method of operation of a gas turbine and adaptations to enable the method to be used. It resides in preventing damage or deterioration of the surfaces which are exposed to gas containing harmful contaminant by keeping them below damage temperature and/or by providing other surfaces to be exposed so as to collect the contaminant and remove it cyclically.

---

This invention relates to the operation and construction of a gas turbine plant. It involves a method of operation of which the main purpose is to conserve the apparatus to prevent deterioration thereof, and constructional features of which the aim is the performance of the method.

It is important, especially in relation to plant-type industrial gas turbines or marine installations, to operate for long periods of duty using cheap fuel. For many years, students of such gas turbines have aspired to operate them on residual oil fuel. This has come to be known colloquially as the "Bunker C" problem, that being the general term used to describe residual fuel oils which become available after the valuable lower fractions have been distilled. In such residual fuel, as a result of combustion, there are left various contaminants, some of which are harmful to gas turbines operating in the usual range of temperatures. The harm they do varies between being purely aerodynamic, purely chemical, or purely mechanical. Aerodynamically, any substance which accretes upon a carefully-designed surface or profile so as to modify its contour or flow-line, does harm in terms of inefficiency; chemically, any attack on the material of turbine blades or other highly stressed parts (or, indeed, any parts) is obviously harmful. A further possible cause of deterioration is erosion, this being basically a mechanical effect. Any surface in gas turbine plant which, at the temperature to which it is exposed, is liable to any such harm, will be described herein as a "sensitive surface," even if by virtue of the invention it is kept below the exposure temperature which it might otherwise reach.

Conspicuous among the potentially harmful ingredients or byproducts of combustion of residual oil fuels is vanadium pentoxide. With or without other contaminants, vanadium presents such a serious problem of harmfulness that it has not been found practicable to use this cheap "Bunker C" fuel for economically long periods, in gas turbines operating at temperatures corresponding to high efficiency. Sodium-based contaminants may also be harmful: indeed it may be that it is the presence of these two ingredients together, or of some further ingredient, which causes the contaminants to be harmful.

In our view, the harmful effects recognised are not necessarily confined to the direct effect of any particular contaminant. There is, in the burning of residual oil, always a certain amount of solid ash. This in itself, though possibly erosive (and therefore mechanically harmful over a very long term) is by our hypothesis not often seriously disadvantageous. But if a contaminant such as vanadium pentoxide goes through a phase (temperature phase) in which it is sticky, then alone or with other ingredients it may form or deposit a surface to which ash adheres and this is a continuing process, so that the incident surface—potentially a sensitive surface —suffers an accretion which not only spoils its aerodynamic profile but may block up a passage. There is some evidence that such an accretion though it may take appreciable time to start, when once started builds up unacceptably quickly. This is a physical effect, and one which causes deterioration of the gas turbine by reducing or even completely spoiling its efficiency. This "sticky" state of affairs may arise over a fairly wide temperature range. In the case of a typical heavy fuel, a metal surface having a superficial temperature from 350° C. up to about 650° C. may become an accretion base (and therefore be a sensitive surface). Particularly when near its dew point vanadium pentoxide is likely to have a strong and harmful chemical effect, corroding the metal which it contacts. Hereafter the term "damage temperature" is intended to mean temperature at which a surface is permanently impaired by some ingredient of the combustion gas contacting it (as by corrosion); and includes very high temperatures e.g. in the range 1100° C.–2000° C. "Accretion temperature" means a temperature in a range in which fuel byproducts deleteriously accrete on surfaces, and thereby deteriorate efficiency by changing its effective profile.

It is considered that if a contaminant is deposited on a surface in the sticky phase (350–650° C. for $V_2O_5$) it will detach or be easily detachable from the surface when it is quickly solidified by cooling below that range for example flaking off by thermal shock. The potential importance of this will become apparent in considering one aspect of the present invention.

It will have been observed in considering the foregoing exposition, that the assumption is made that the harmful contaminant is such that it survives or is created by the combustion of fuel, in the form in which the contaminant is harmful. This is true (for example) of vanadium pentoxide ($V_2O_5$), which having been formed during combustion seems not to dissociate or decompose, or combine with another reagent, during or after the combustion of the fuel, though its harmfulness is believed to be due to dew-point corrosion. Also, there may be catalytic or similar undisclosed effects. For convenience we will call such a contaminant, i.e. one which survives the process of combustion, as "indestructible" for the purposes of this specification: in our present context the prominent example of an indestructible contaminant is $V_2O_5$.

According to the invention there is a method of operating a gas turbine on potentially harmful fuel, the method residing in immunising sensitive surface by preventing or avoiding contact between combustion products and the surface at a damage temperature or at an accretion temperature, whereby the gas turbine is protected against deterioration.

According to another aspect of this invention, a method of conserving a gas turbine plant against deterioration when using fuel of which the combustion products have an indestructible ingredient which is potentially harmful (at the temperature of such products) to a surface which the products contact, such method residing in keeping the surface below the temperature range which includes the damage temperature and the accretion temperature. Preferably, this method is performed by supplying a fluid coolant, and using the heat energy which it takes up to do useful work.

The method above stated may according to the invention be varied or elaborated by interposing in the working gas stream a filter such as one which is continuously cyclically exposed in the stream and then cooled, so that it picks up or accretes contaminant material from the gas when sufficiently hot, which material is then washed off, flakes off by thermal shock, or is otherwise removed when the filter is cooled; this operation may involve the rotation of a filter in such a manner that an area of it extends across and is exposed to the gas stream whilst another area is immersed in and therefore exposed to water (these areas continuously changing their exposure) and steam evolved by reason of the continued cooling and wetting of the filter joins the gas stream so forming part of the working fluid.

Also according to the invention, a gas turbine has such provision for cooling that sensitive surfaces contacted by the working gas after combustion, be they stationary or rotating, are kept below the damage temperature and the accretion temperature. Again according to the invention, there may be provided a form of filter interposed in the working gas stream after combustion and before sensitive surfaces, which filter is so contrived as to result in accretion upon it by its temperature being raised by its exposure into the range of accretion temperature and further so that the filter is cyclically quenched in water so that the accretion is removed by being washed off and/or by thermal shock, and if this results in the generation of steam (as it must even to a small extent) the steam joins the gas as a working fluid.

Fluid coolant is intended to be employed for the surfaces, and whilst this may operate on the basis of there being an inter-mediate coolant (such as sodium) there is in the end of a supply of primary coolant (e.g. water) to remove the heat; and this may be feed-water to a steam cycle, or if itself converted into steam, the steam is so used.

The invention further includes the provision in a gas turbine having a multistage turbine, of internal fluid cooling means throughout all stages at which there are sensitive surfaces, not only of rotor but of stator blading, and also of adjacent surfaces where they are contacted by the working gas. This is an unusual provision, since usually it is not regarding as being necessary to cool all these turbine surface at the downstream stages. To achieve the object of the present invention however, all sensitive surfaces must be made immune.

It is to be noted that the provisions mentioned above do not necessarily greatly reduce the mean temperature of the working gas, since only that gas which actually forms the boundary layer on a surface, will be sensibly cooled by the surface. Indeed it has been approximated in relation to one design project that the heat abstraction by cooling from the working gas is such as to reduce the gas temperature about 18° C. per stage which is regarded as tolerable, especially when the heat abstracted is to some extent made useful.

The invention includes a gas turbine engine so constructed that the superficial temperature of surfaces which are exposed to combustion products which include an ingredient potentially harmful to these surfaces is maintained below damage temperature and below accretion temperature, the engine being adapted by its combustion arrangements and other detail to operate on residual oil fuel. It further includes a gas turbine engine which is provided with means for filtering or retaining from the working gas a potentially harmful ingredient, so that the working gas is rid of such ingredient downstream of its normal combustion and before it comes into contact with sensitive surfaces. Preferably such means comprise passages for the combustion products the walls or margins of which are so shaped aerodynamically as to deposit the ingredient on to a surface which is repeatedly cooled and purged of the ingredient which, by virtue of such cooling, is accreted on such surface and then scaled, scraped, or flaked off. The filtering means may comprise surfaces which act centrifugally, i.e. by diverting the direction of gas flow cause its burden of contaminant to be deposited by the effect of its mass, or it may be such as to present areas of cool surface which move in the gas stream so as to intercept the contaminant. Thus when we speak of a filter we intend to include a separator which, basically, operates centrifugally.

The invention is schematically illustrated by reference to the accompanying drawings. In some cases, the constructions indicated will be recognized as pertaining to known technique, and the purpose is to show how such is applicable in the present invention.

In the drawings:

FIG. 3 is a view on the same lines as FIG. 1 of a varied arrangement of turbine rotor.

FIGS. 4 and 4A, and FIGS. 5 and 5A illustrate schematically by two elevations at right angles, two forms of filter device for use in a gas turbine according to the invention.

FIGS. 6A, 6B, 6C and 6D illustrate a way of fluid-cooling a transfer passage and entry guide vane leading into the turbine.

FIGS. 7A, 7B, 7C, 7D illustrate one form of fluid-cooled stator blade.

FIGS. 8A, 8B, illustrate another form of fluid-cooled stator blade, and

FIG. 8C is a minor variant thereof.

FIG. 9 illustrates a further form of individually fluid-cooled stator blade; and FIG. 10 illustrates a still further form of individually fluid-cooled stator blade.

Figure 1:
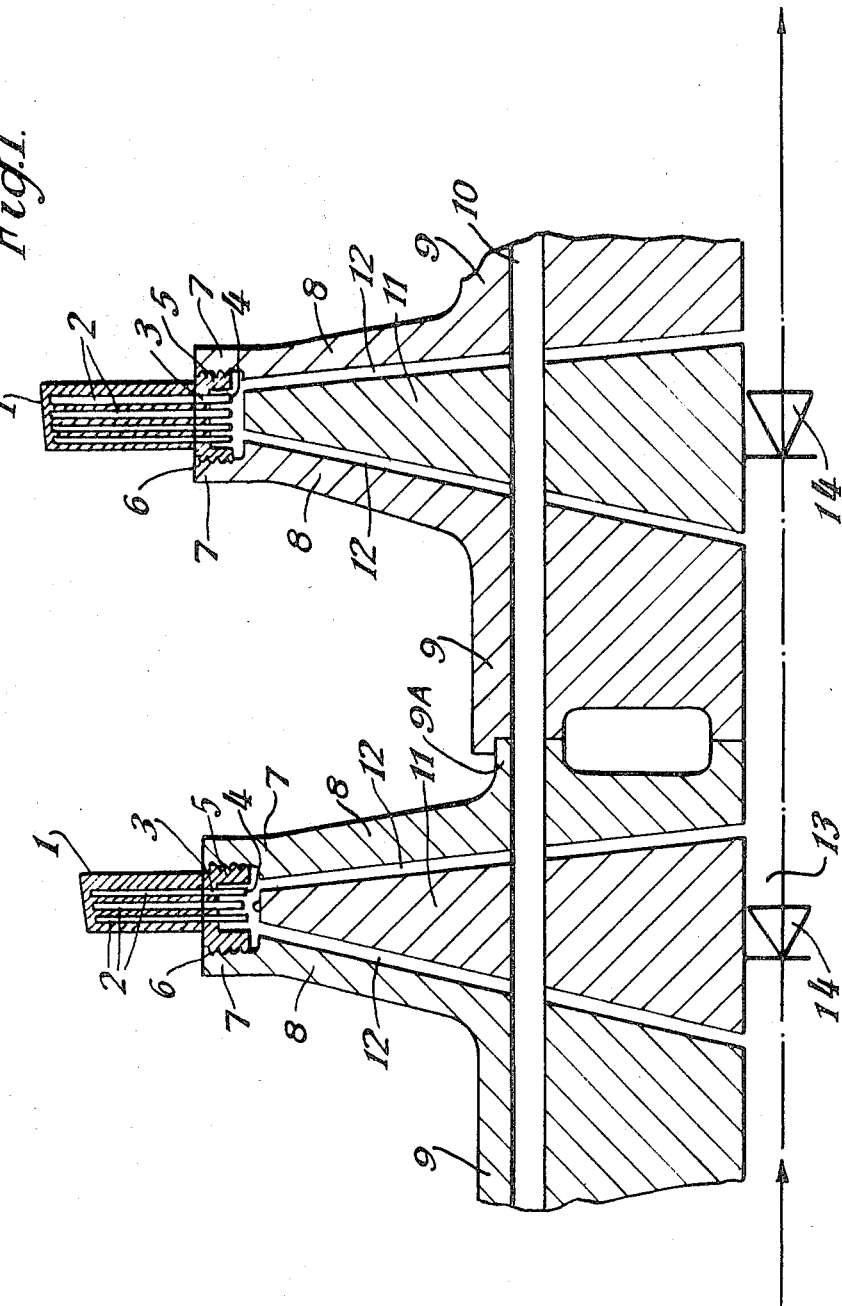
FIG. 1 is a sectional fragmentary view illustrating a turbine rotor construction.

In FIG. 1 the construction involves blades with internal liquid cooling by convection, there being forced convection in the rotor: whilst only two blade rows are indicated, the rotor will in practice have a larger number.

The blades 1 have radial cooling bores 2 drilled in them and at the root end, these are continued as stubs 3 of tube, which project into a cavity 4 formed in the blade root 5; the root has external arcuate serrations at 6, engaged in complementary circular grooves formed in facing flanks of rims 7 which are continuations of the somewhat frustoconical disc parts, 8. Each part 8 is integral with a boss 9 or 9A, and a boss 9A is spigotted into an adjacent boss 9, and the disc parts are drawn together, holding the blades 1 between their rims, by axially-directed bolts at 10. Between and spaced from each pair of opposed discs 8, is a tapered-section separator disc 11; the spaces between discs 8 and 11, at 12, are open to an axial passage 13 which extends through the length of the rotor assembly and in which there are, preferably, non-return valves indicated at 14 to ensure that water can only pass one way through the passage 13. Not shown, there is preferably provided at the downstream end of the rotor, a controllable flow valve.

The tubes formed by the bores 2 and 3 are nearly filled with sodium; this acts as a primary convective coolant, removing heat from the blade 1 and transferring it out of the stubs 3, into water which flows outward through a space 12, through the cavity 4, and inward (being now hotter and therefore of less density) through the next space 12, so rejoining passage 13 wherein, because of the intervening valve 14, it can only flow downstream in the rotor to the next pair of discs. The blades 1 must be fitted in sealed manner with the rims 7 and each other; this may be done by welding, or by copper-brazing using a thin film of copper, or as may otherwise be expedient.

Figure 2:
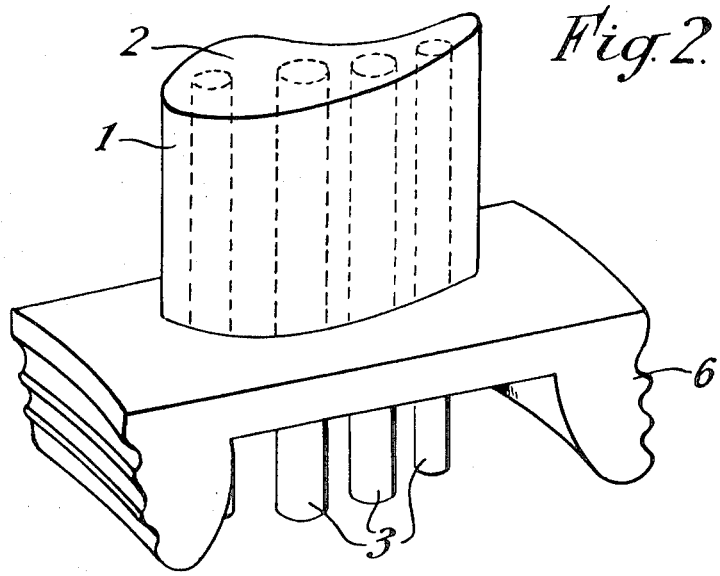
FIG. 2 is a view in perspective and on larger scale, of the root arrangement of a blade of FIG. 1.
Figure 6B:
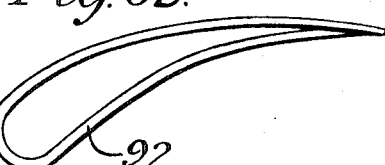
Figure 6A:
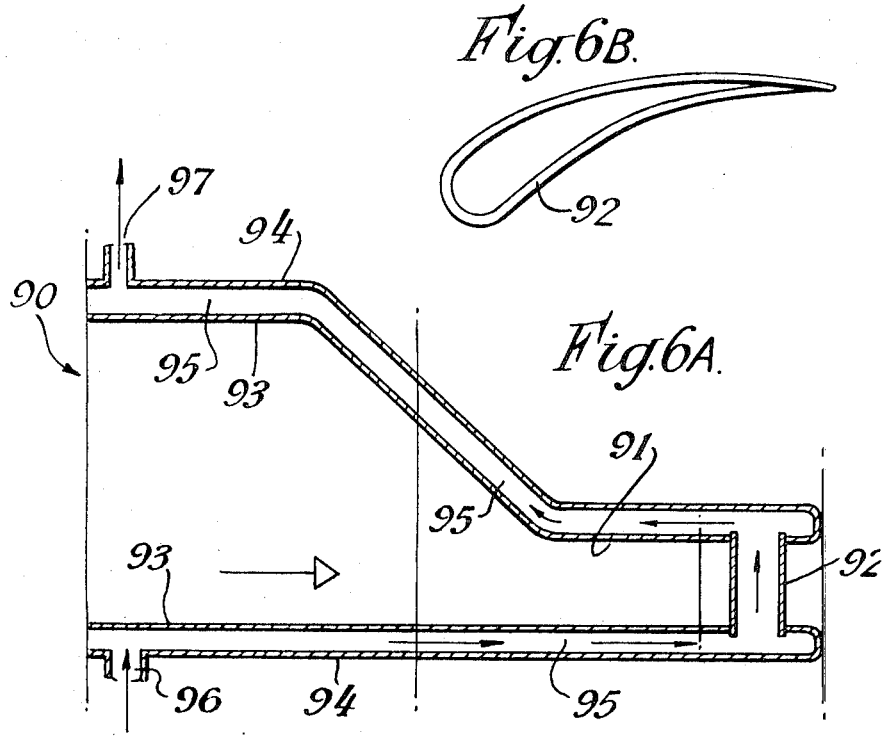

In FIG. 2 the blade roots are illustrated more clearly, the references being the same.

It will be appreciated that in view of the very high centrifugal force, the thermal density-difference in a pair of spaces 12 produces a strong thermosyphon effect; if there be a condition such that steam might be evolved at lesser radii or in the passage 13, the whole of the water duct system may be pressurized, e.g. by pump. The heat in the water from the downstream outlet of passage 13 is, of course, available to do such work as it may be applied to.

In FIG. 3 a different and entirely water cooled system is illustrated. The rotor, which is in sections welded together at 31, forms a hollow drum having end discs 32 and a series of intermediate sections each comprising a rim 33A and an internally-extending web 33B which is drilled as at 33C at a certain radius. Each rim 33A carries a row of blades 34, in the case having tapered circumferentially-grooved roots. The assembled blades and rim have radial bores 34A which extend from near the blade tip, to open inwardly into the interior of the rotor drum. At the upstream end of the rotor, the disc 32 incorporates a water impeller indicated at 35, which is supplied by a feed duct 35A in the turbine shaft. At the downstream end the disc 32 has inward ducting at 35B to a flow control device. In operation, water is so supplied through duct 35A as to maintain a (radial) level indicated at 36 which submerges the drillings 33C, and is controlled primarily by the location at 35C of the entrance to the ducting 35B, the control being actuated by the presence or absence of steam in duct 35B.

When running there will be a large thermosyphon effect set up in the blade cooling passages 34A due to the large accelerating forces present. The cooler water will flow up the inside of the passages and the heated water will return down the outside. The design will ensure that the heated water will flash off into steam at the free surface of the water contained in the rotor. The steam is then led away at the low pressure end of the turbine, through an axial passage in the turbine shaft, at 37. Make-up water is supplied at the high pressure end of the turbine and is delivered to the main water reservoir at steam pressure through the impeller 35.

It is necessary to ensure that the water level does not fall too low as the results could be catastrophic. It is also equally important that the water level should not rise far above the design level, as at 36.

This is effected by a steam controlled water feed valve. When the water level falls below a pre-determined value steam is blown off and operates the water feed valve. The rising water then eventually seals off the steam supply at the design level.

Figure 4A:
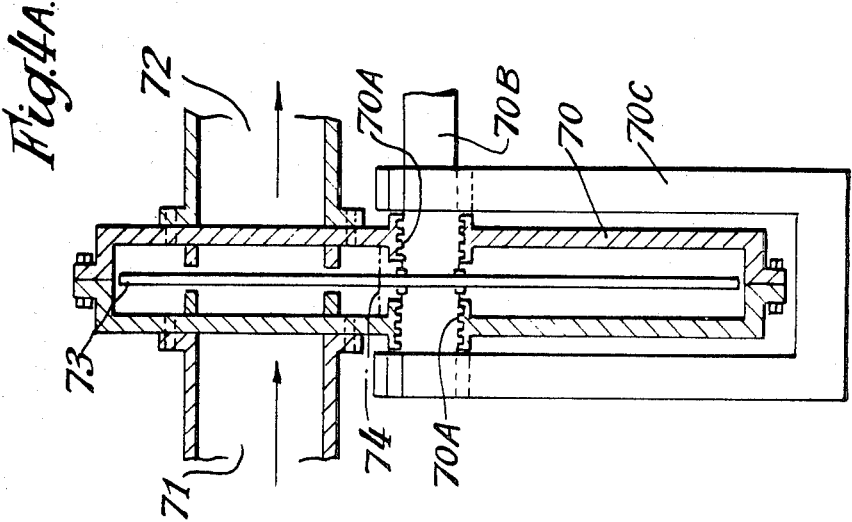
Figure 4:
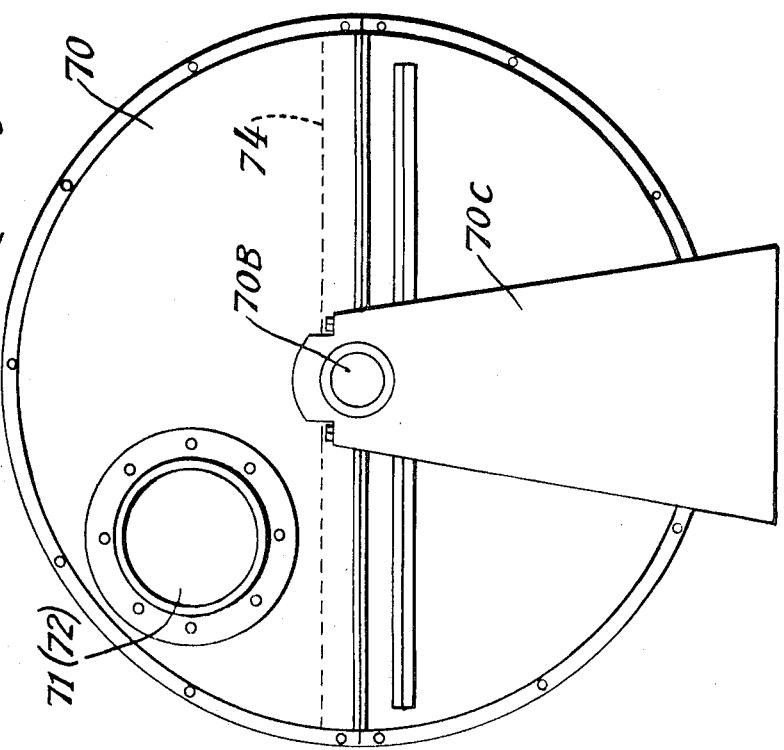

In FIGS. 4 and 4A there is illustrated a rotary filter for interposition in a transfer duct leading combustion gas from a combustion chamber to the turbine inlet. The illustration is purely schematic. There is a somewhat flat circular casing 70 supported on bearings, and water sealed, at 70A on a drive shaft 70B itself borne on a bearer 70C. Into one side of the casing 70 opens a duct 71 leading combustion products into the casing; and the products are educted by duct 72, to the turbine entry. Within the casing 70 is a disc 73, fast on the shaft 70B, which disc is a filter of such material as to withstand repeated cycles of heating and cooling. In some cases, the filter may have closely-spaced aerodynamically profiled blades or vanes, so that it constitutes a self-driving turbine to run at relatively slow speed; and in such case the shaft 70B is not driven, but the disc 73 is borne on it. Up to a level indicated at 74 the casing 70 holds water, and (not shown) there is provision for topping this up. Provision is made for the removal of scaled-off solid contaminants.

The disc 73 passes through itself the combustion products, i.e. the working gas. The disc being cool, contaminants accrete upon it. In course of its rotation, the accretion is plunged into the water which rapidly cools it (and the filter) and the accretion flakes off and settles through the water. The disc may be arranged to be vibrated or scraped so as to break off or remove and shed the accretion. When an area of the disc has cooled down approximately to the water temperature it re-emerges, now clean, and the cycle repeats. The water, as the filter temperature is again raised by the working gas, is evaporated and the steam so generated joins the gases to form part of the working fluid. There may be a plurality of such filters in series.

Figure 5A:
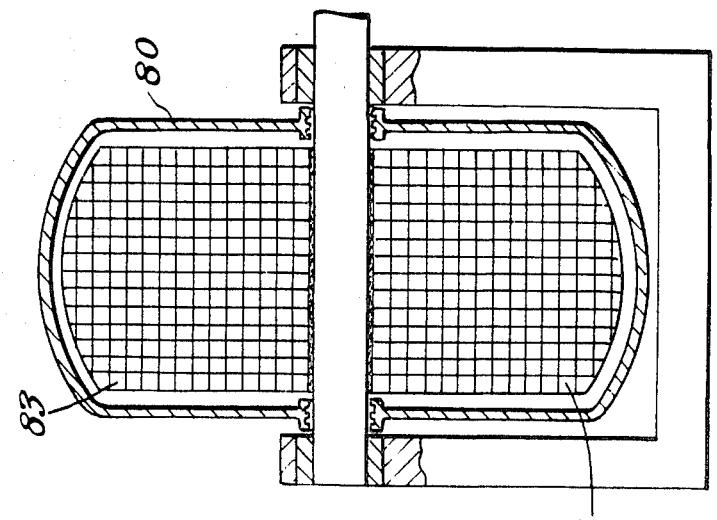
Figure 5:
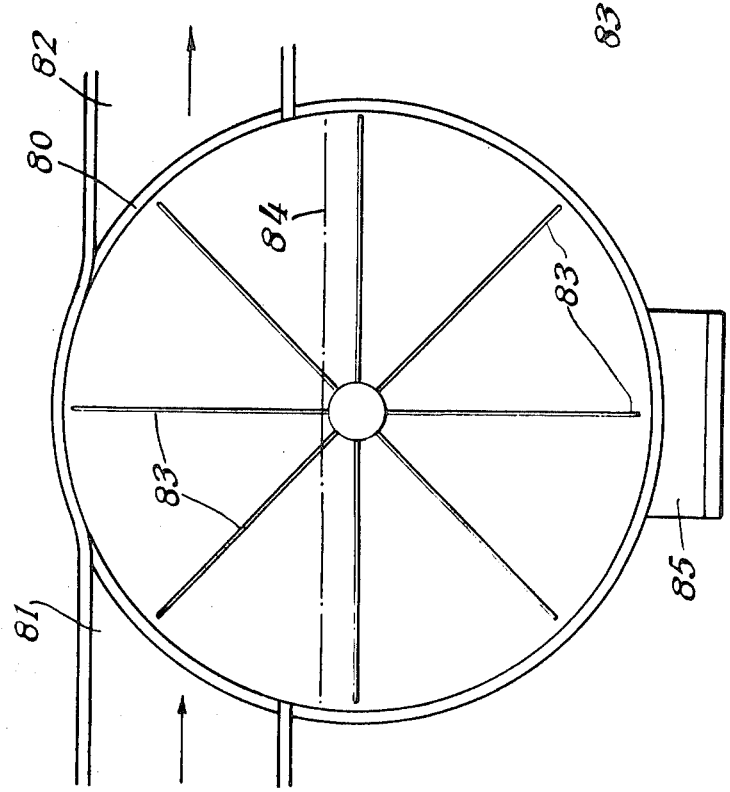
Figure 6C:
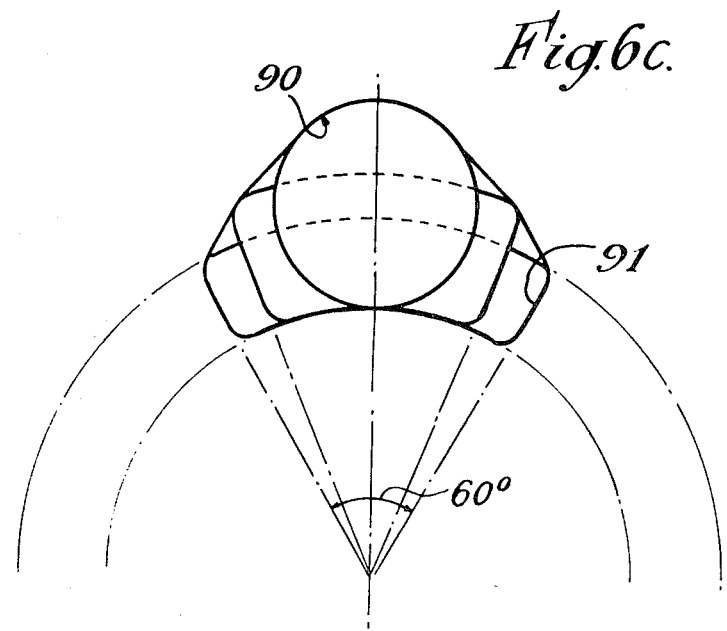
Figure 6D:
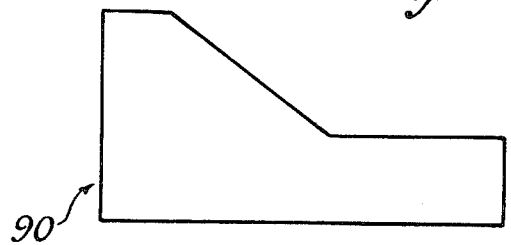

FIGS. 5 and 5A illustrate an alternative construction of filter, using the same basic principle. In this, a casing 80 (similarly mounted, in general, to that of FIG. 4) has an entering duct 81 and exit duct 82, these being aligned and generally tangentially.

In the casing (which has a water level indicated at 84) rotates a filter rotor, comprising paddle-like mesh vanes 83 mounted radially on the drive shaft. The vanes 83 occupy practically the whole cross-sectional area of the casing and are of such number that the combustion gas inevitably passes through at least one vane. The casing has a sump 85 for contaminant.

Such a filter as that of FIG. 4 or 5 if employed, is contemplated for use in addition to the surface cooling of which examples are shown.

FIGS. 6A, 6B, 6C and 6D illustrate schematically how sensitive surfaces between the combustion chamber(s) and turbine entry, may be fluid-cooled. Whilst it is presently intended to use water as the coolant other liquids, or steam or even maybe a gas, may be used as the coolant fluid.

There is illustrated a transfer passage unit in which the upstream end is a circular-sectioned opening at 90 which is blended by change of section (see FIG. 6C) into an arcuate segment at 91, towards the downstream end of which are arranged turbine entry guide vanes 92. The whole structure is of sheet metal and is basically a double walled structure, the inner wall 93 presenting the sensitive surface, and together with the outer wall 94, enclosing a coolant jacket 95 which has inlet and outlet connections 96, 97. The guide vanes 92 are fabricated out of sheet metal and secured by welding or in other suitable manner, and being hollow (FIGS. 6A, 6B) they interconnect the inner and outer regions of the jacket 95. The downstream segments 91 of the complete circular assembly collectively constitute the turbine inlet annulus: in the proportion indicated in FIG. 6C, six units as above described, are used, each subtending 60° of the annulus. The connections 96, 97 of such units are preferably so located that those of each unit are as nearly as possible at bottom (96) and top (97) so that coolant, which is pumped through (assuming the thermosyphon effect is insufficient in a stator part). Any baffles or deflectors such as are found necessary to control the internal flow of coolant, are provided. The outer wall 94 may be the major stress-carrying part of the unit, so that the inner wall 93 may be thin and if required of a high-conductivity but relatively low strength metal: and there may be internal webs, braces, or other structure to enable the wall 94 to support wall 93 structurally.

Preferably, the upstream parts (to the left of B—B in FIG. 6A) are separate, whilst downstream the units converge to constitute an uninterrupted annulus. The portions between C—C and D—D are separately fabricated with the vanes 92.

The stator blade illustrated in FIGS. 7A, 7B, 7C, 7D is basically a sheet-metal blade with skin 100 (the outside of which is a sensitive surface), and the inner blade tip is welded to a hollow channel-sectioned shroud ring 101. The root is likewise welded to the blade ring 102, which is also a hollow channel. The outer (cylindrical) surface 102A of the ring 102 has, for each blade, a coolant exit connection 104 and it is pierced for a coolant entry duct 103 which is circular-sectioned where it passes through the surface 102A, and internally blends into a flattened shape 105 (FIG. 7C) of a profile roughly similar to that of the skin 100. Across coolant space which is left at 106 between the skin 100 and the portion 105, are supporting ribs or webs 106A. The end of the portion 105 is open, towards the blade tip. Coolant is pumped in via 103, flushes the interior of the blade, floods the shroud ring 101 and blade ring 102, and leaves via 104. The blades of a complete ring may be supplied in parallel, or groups connected in series may be supplied in parallel. This construction is deemed to be suitable for stator blading after the first turbine stage.

FIGS. 8A, 8B, 8C illustrate another form of stator blade. In these, the blade 110 is drilled lengthwise to form (say) four coolant ducts 111. Each blade is attached to a channelled blade ring 112 and like shroud ring 113 (these are shown with open channels, but will in fact be closed or form part of an assembly which is itself a coolant jacket.) There are two ways in which flow in an assembly of such blades is proposed to be controlled, in each case by using blockings in the channels. In FIG. 8B, the flow in general is circumferential in the blade ring 112 of which the channel is, however, blocked as indicated between every two blades, whilst the channel of the shroud ring 113 is similarly blocked but between alternative pairs of blades. The effect is then that coolant flows down one blade, along the shroud ring, and up the next blade beyond a blade ring blockage, and so on; the flow pattern is indicated by the arrows in FIG. 8B. The blades are then in series, over a considerable arc of the whole row. In FIG. 8C, pairs of blades are individually supplied with coolant, by arranging the blockages in the channels of the rings so that each pair of blades is isolated from the other. In this case the blade ring 112 has as many inlets and outlets for coolant as there are pairs of blades. Obviously, the actual grouping of blades in either example, is open to choice; there may for example be three blades in a blockage group.

FIG. 9 illustrates another arrangement for the internal cooling of a blade, primarily for a stator blade, in which as in FIG. 7A the coolant connections are at one end only. The body of the blade 120 has at least one (probably more than one) lengthwise blind drilled bore at 121, which at the root end open into a channel-sectioned cavity 122 in the blade root 123. The floor of the cavity 122 has an aperture through which leads a coolant duct 124 which extends nearly to the blind end of the bore 121 into the ducted end of which bore the duct 124 opens. From the cavity 122 is a coolant return connection 125. The duct 124 is supported within the bore 121 by having projecting modules formed on the duct, and these may be arranged to be in firm contact with the wall of the duct, to conduct heat. The coolant flows into the blade through the duct 124 and out by the cavity 122 and connection 125.

In FIG. 10 is shown a blade 130 of considerable chord-length ratio mounted on a root 131 presenting a channel section (as in FIG. 9) through the flow of the channel cavity 133 of which are (three for example) coolant ducts 132 which bridge the channel 133 and connect to bores 134 which are lengthwise in the blade 130. A second set of bores 135 in the blade, open into the channel 133, from which there is a coolant outlet 136. Each bore 134 is connected by a short cross-duct 137, to its companion bore 135, and the cross-ducts are formed in two cases by drilling the blade laterally and in the median case by drilling endwise, the holes in the blade body necessary for duct-drilling being plugged as at 138, 139. The supply ducts 132, are connected preferably in parallel, to the source of coolant, and the outlet duct 136 of each blade is connected to those of the other blades; or, all the ducts 136 of a row of blades, open into a common chamber or jacket.

It will be understood that in the foregoing description, the main purpose has been to indicate a variety of devices and expedients all of which are not individually novel, but which may be embodied in gas turbine plant according to the invention, and then combined with other features to fulfill the functions which the invention involves. It will then be further evident that there is a wide variety of structures and devices which may be adopted, those portrayed being indicative of the function and desiderata rather than being specifically as described.

I claim:

1. A method of operating a gas turbine of the type in which a gas operates the turbine blade, said method comprising the steps of: introducing into the turbine to operate the turbine blades a gas at a temperature of at least 620° C., at least a portion of which gas is the combustion product of a residual fuel which contains harmful contaminants at the said temperature of operation, immunizing all sensitive surfaces of said gas turbine which are those surfaces exposed to said gas, and hence subject to the harmful effects of the said contaminants in said gas, by substantially preventing contact between said gas and said sensitive surfaces at (a) a damage temperature which is that temperature, normally in the order of 620° C. or above at which occurs permanent impairment of a sensitive surface by a contaminant of said gas contacting said sensitive surface and (b) the accretion temperature which is that temperature lying within the range of 350° C. to 620° C. at which accretion of by-products of said residual fuel on said sensitive surfaces occurs, said immunizing step including cooling all parts containing the said sensitive surfaces during any given operation of the turbine to keep the said sensitive surfaces below both the damage temperature and that accretion temperature of the said range which is applicable during said given operation of the turbine.

2. A method of operating a gas turbine according to claim 1, which resides in using a fuel of which the combustion gas contains $V_2O_5$.

3. A method according to claim 2 which includes the step of continuously removing heat from the sensitive surfaces by heat-exchange including fluid convection from within the parts having such surfaces and utilising the conveyed heat.

4. A method according to claim 1 including the step of separating contaminant matter from the gas before such gas contacts the sensitive surfaces by passing the contaminated gas over surfaces which are at such temperature as to result in accretion of the contaminant, and continuously removing the resultant accretion by rapid cooling of the surfaces.

5. A method according to claim 1, in which during operation at such a low temperature as to give rise to damage during starting and runnig-up or running-down only a non-harmful fuel is burned.

6. The method of claim 1, wherein the sensitive surfaces are cooled below 450°C.

7. A gas turbine comprising a means for directing a gas, at least a portion of which is a combustion product of a residual fuel, to operate the turbine blades, immunizing means for maintaining all sensitive surfaces of said gas turbine, which are those surfaces exposed to the harmful effects of contaminants in said gas, substantially free from contact with said gas at (a) a damage temperature which is that temperature at which occurs permanent impairment of the sensitive surfaces by a contaminant of said gas contacting a sensitive surface and (b) the accretion temperature which is that temperature at which accretion of by-products of said residual fuel on said sensitive surfaces occurs, said immunizing means including means for circulating fluid coolant through the hollows of all parts containing said sensitive surfaces to keep the temperature of said sensitive surfaces below both said damage temperature and said accretion temperature, said sensitive surfaces including a combustion gas duct for delivering combustion gas to the turbine, and wherein the means for circulating fluid through said combustion gas duct comprises an inner wall within an outer wall spaced from the inner wall to form said combustion gas duct, and a plurality of stator blades interconnecting said walls, said walls both being walls of hollow bodies and the said stator blades being hollow and having their bodies in open communication for flow of a coolant fluid between the hollows of said bodies.

8. A gas turbine according to claim 7, which has a plurality of turbine stages in series.

9. A gas turbine according to claim 7, in which the coolant fluid from both static and rotary parts is collected, and means are provided which duct such fluid from said parts for use of the heat conveyed by the fluid.

10. A gas turbine adapted to operate on a potentially harmful fuel by the provision of a transfer passage between its combustion chamber means and the entry of its turbine, of a filter adapted for the accretion of contaminants from the combustion gas and for the cyclical removal of such accretion without interrupting the filtration, said filter comprising a rotary element through one portion of which the combustion gas passes while the remainder is passing through cooling water which causes detachment from the filter of accreted contaminants, and including means whereby the stream generated by the heating of water joins the combustion gas upstream from the turbine.

11. A gas turbine according to claim 10, adapted to operate on fuel of which the combustion gas contains $V_2O_5$ and in which the normal working temperature is not less than 620° C., by providing that the filter surfaces exposed to the gas are maintained at temperatures between 450°C. and 620° C.

References Cited

UNITED STATES PATENTS

| | | | |
|---|---|---|---|
| 1,960,810 | 5/1934 | Gordon | 60—39.66X |
| 2,149,510 | 3/1939 | Darrieus | 60—39.02X |
| 2,474,404 | 6/1949 | Richeson | 253—39.15(B)UX |
| 2,608,055 | 8/1952 | Welsh | 60—39.46X |
| 2,618,120 | 11/1952 | Papini | 60—39.66X |
| 2,692,477 | 10/1954 | Toogood | 60—39.5UX |
| 2,771,741 | 11/1956 | Barnard | 60—39.06 |
| 2,895,293 | 7/1959 | Hodge | 60—39.46X |
| 3,350,877 | 11/1967 | Bowman | 60—30 |

FOREIGN PATENTS

| | | | |
|---|---|---|---|
| 734,231 | 7/1955 | Great Britain | 60—39.46 |
| 754,856 | 8/1956 | Great Britain | 60—39.66 |

CARLTON R. CROYLE, Primary Examiner

U.S. Cl. X.R.

60—39.59, 39.66, 39.46, 39.33, 39.75; 415—1; 416—1, 95